(12) United States Patent
Hofmeister

(10) Patent No.: US 9,344,409 B2
(45) Date of Patent: May 17, 2016

(54) METHOD AND APPARATUS FOR MASKING NON-PUBLIC DATA ELEMENTS IN UNIFORM RESOURCE INDENTIFIERS ("URI")

(71) Applicant: Bank of America Corporation, Charlotte, NC (US)

(72) Inventor: Michael K. Hofmeister, Clover, SC (US)

(73) Assignee: Bank of America Corporation, Charlotte, NC (US)

( * ) Notice: Subject to any disclaimer, the term of this patent is extended or adjusted under 35 U.S.C. 154(b) by 67 days.

(21) Appl. No.: 14/334,889

(22) Filed: Jul. 18, 2014

(65) Prior Publication Data
US 2016/0021065 A1    Jan. 21, 2016

(51) Int. Cl.
*H04L 29/06* (2006.01)
*G06F 7/58* (2006.01)

(52) U.S. Cl.
CPC ............ *H04L 63/0428* (2013.01); *G06F 7/588* (2013.01)

(58) Field of Classification Search
CPC ... H04L 63/0428; G06F 7/588; G06F 21/316; G06F 21/32; G06F 21/33; G06F 21/335
USPC .......................................................... 726/30
See application file for complete search history.

(56) References Cited

U.S. PATENT DOCUMENTS

| | | | |
|---|---|---|---|
| 7,882,546 B2 | 2/2011 | Laertz et al. | |
| 8,347,392 B2 | 1/2013 | Chess et al. | |
| 8,560,843 B1 | 10/2013 | Moscaritolo et al. | |
| 8,654,971 B2 | 2/2014 | Orsini et al. | |
| 2001/0027519 A1* | 10/2001 | Gudbjartsson | G06Q 20/383 713/168 |
| 2002/0112167 A1* | 8/2002 | Boneh | H04L 63/0428 713/182 |
| 2003/0061515 A1 | 3/2003 | Kindberg et al. | |
| 2009/0254572 A1* | 10/2009 | Redlich | G06Q 10/06 |
| 2009/0276474 A1* | 11/2009 | Sela | G06F 17/30218 |
| 2009/0328153 A1 | 12/2009 | Chetuparambil et al. | |
| 2010/0146600 A1 | 6/2010 | Eldar et al. | |
| 2012/0072598 A1 | 3/2012 | Zhong et al. | |
| 2012/0072918 A1 | 3/2012 | Zhong et al. | |

(Continued)

OTHER PUBLICATIONS

"Preventing an Apache 2 server from Logging Sensitive Data," ServerFault.com, Apr. 16, 2013.

(Continued)

*Primary Examiner* — William Goodchild
(74) *Attorney, Agent, or Firm* — Weiss & Arons LLP; Michael A. Springs, Esq.

(57) ABSTRACT

Methods may display a URI of a resource. Methods may determine the presence of a non-public data element in the URI. Methods may generate a random number in response to the determination of the presence of the non-public data element. Methods may compute a resultant number based on the exclusive or of the random number and the non-public data element. Methods may substitute the resultant number for the non-public data element in the URI. Methods may transmit the URI and the random number to a server. Methods may receive a resource from the server, in response to the transmission of the URI and the random number to the server. Methods may compute the non-public data element using the random number and the resultant number. Methods may substitute the non-public data element for the resultant number in the URI. Methods may re-determine the URI of the resource.

20 Claims, 7 Drawing Sheets

(56) References Cited

U.S. PATENT DOCUMENTS

2014/0012750 A1* 1/2014 Kuhn .................... G06Q 20/36
705/41
2014/0095890 A1 4/2014 Mangalore et al.

OTHER PUBLICATIONS

Bruce Schneier, Applied Cryptography, 1996, John Wiley & Sons, Inc., New York, New York.

* cited by examiner

METHOD AND APPARATUS FOR MASKING NON-PUBLIC DATA ELEMENTS IN UNIFORM RESOURCE INDENTIFIERS ("URI")

FIELD OF TECHNOLOGY

This invention relates to uniform resource identifiers ("URI").

BACKGROUND OF THE DISCLOSURE

As is well known in the art, most webpages have an address known as a URI. When a user visits a webpage the URI usually appears at the top of the webpage, notifying the user what webpage he is visiting.

URIs may also be used to identify other resources, including internet resources. Some internet resources may not be accessible by humans, but rather by automated agents. Some resources may not be visible on a webpage or using an internet browser.

Web developers generally create URIs for webpages that substantially describe the webpage. Self-describing URIs support productive flexible exploration of the world-wide web for human users, automated agents, as well as web developers.

Because web developers generally create self-describing web addresses, URIs many include sensitive information, such as a user name, a user social security number, and/or a user id. In many businesses which operate using the World Wide Web, there are a wide range of devices including, but not limited to, load balancers, proxy devices, and web servers, which log user URIs remote from a user location. These URIs, which may contain sensitive information. The sensitive information may become plainly visible and/or searchable to anyone with access to log files. Log files may be files which record the events that occur on a computer or server while an operating system or other software runs.

In addition, a user's personal computer, smartphone, PDA, tablet, or any other suitable computing device with internet capability may save the recently visited URIs in a URI history file, or any other suitable location. Any human or automated machine that may have, or obtain, access to the user's personal computing device could obtain sensitive information simply by viewing the list of URIs in the URI history file, or any other location, where the user's URI history may be stored.

Therefore, there is a need for a method and apparatus which would retain the benefits of self-describing URIs, yet provide a user with privacy regarding sensitive information which may be found in the URIs.

SUMMARY OF THE INVENTION

An apparatus for masking non-public data elements in uniform resource identifiers is provided. The apparatus may include a resource. The resource may be a webpage. In some embodiments, the resource may be accessible only by automated agents. The apparatus may also include a uniform resource identifier ("URI"). The URI may be configured to identify the resource. The apparatus may also include a processor. The processor may be configured to determine the presence of a non-public data element or sensitive information in the URI.

The non-public data element or sensitive information may be information associated with an individual person that is subject to consumer privacy regulations. The non-public data element or sensitive information may also be information associated with an individual person that is subject to consumer related industry information protection standards. Information provided by a consumer to a business entity including name, address and social security numbers may be examples of non-public data elements or sensitive information. Consumer identity information, for example, online id, online password and identity verification answers, which may be used to verify a person's identity based on personal information, may also be examples of non-public data elements or sensitive information. Details relating to online transactions and/or online accounts may also be examples of non-public data elements or sensitive information. Different lines of business may classify specific elements of data as non-public data elements or sensitive information.

The processor may be further configured to generate a random number in response to the determination of the presence of a non-public data element. The binary length of the random number may be at least as long as the binary length of the non-public data element.

The processor may be further configured to compute a resultant number based on a mathematical calculation. The mathematical calculation may be the exclusive disjunction of the random number and the non-public data element. The mathematical calculation may be the exclusive or of the random number and the non-public data element.

The processor may be further configured to substitute the resultant number for the non-public data element in the URI. Once substituted, the revised URI may serve the same purpose—i.e. to point to the same resource—as the original URI, but with the confidential information masked.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
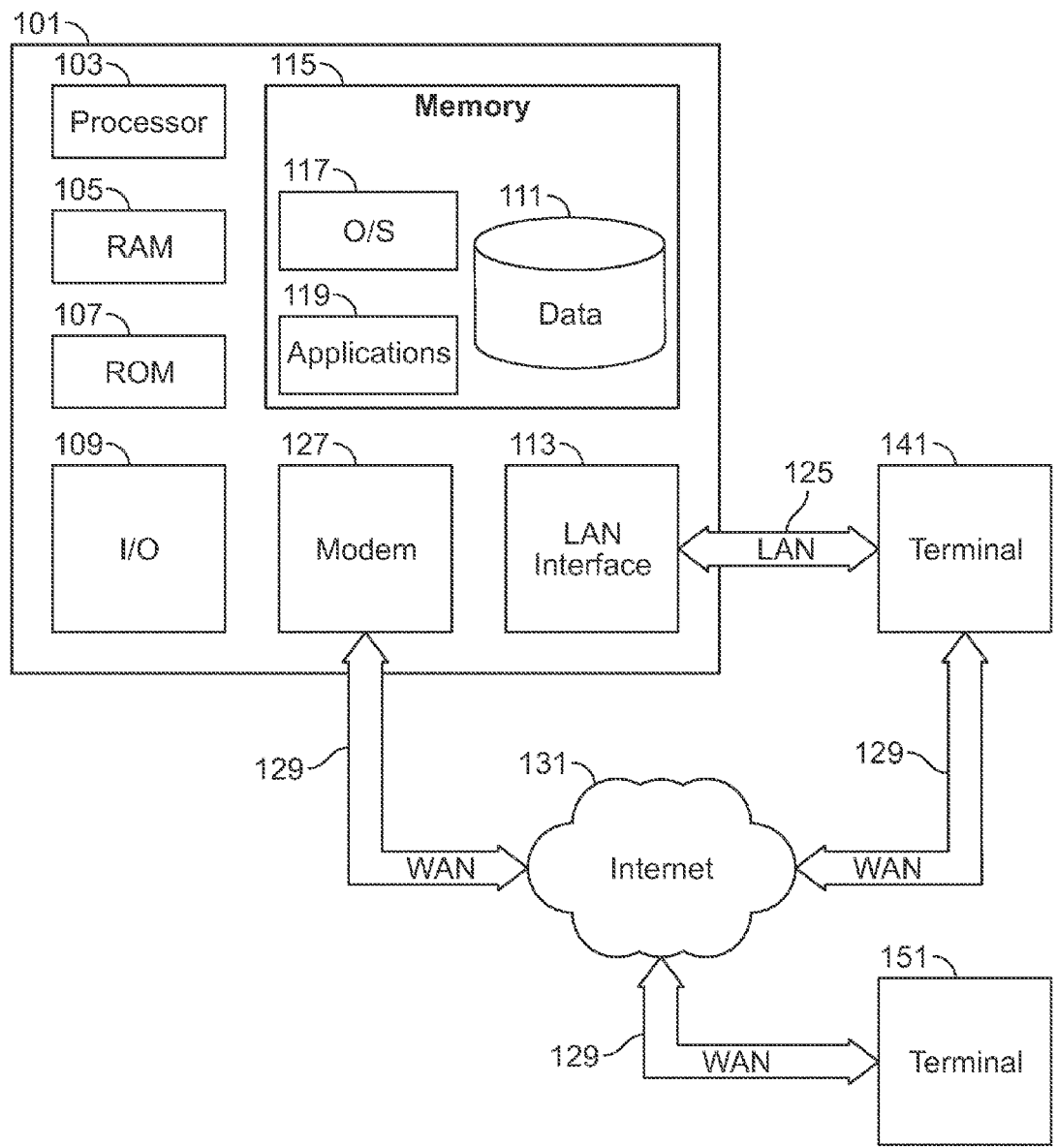
FIG. 1 shows an illustrative apparatus in accordance with principles of the invention.

Apparatus and methods for masking non-public data elements in universal resource identifiers are provided. Such apparatus and methods may include computer hardware and software that are compatible with the internet and the world-wide web.

The apparatus may include a resource. The apparatus may also include a uniform resource identifier ("URI"). The URI may be configured to identify the resource. The apparatus may also include a processor. The processor may be configured to determine the presence of a non-public data element or sensitive information in the URI.

The non-public data element or sensitive information may be information associated with an individual person that is subject to consumer privacy regulations. The non-public data element or sensitive information may also be information associated with an individual person that is subject to consumer related industry information protection standards. Information provided by a consumer to a business entity including name, address and social security numbers may be examples of non-public data elements or sensitive information. Consumer identity information, such as, for example, an online id, an online password and identity verification answers, which may be used to verify a person's identity based on personal information, may also be examples of non-public data elements or sensitive information. Details relating to online transactions and/or online accounts may also be examples of non-public data elements or sensitive information. Different lines of business may classify specific elements of data as non-public data elements or sensitive information.

The processor may be further configured to generate a random number in response to the determination of the presence of a non-public data element. The binary length of the random number may be at least as long as the binary length of the non-public data element.

The processor may be further configured to compute a resultant number based on a mathematical calculation. The mathematical calculation may be the exclusive disjunction of the random number and the non-public data element. The mathematical calculation may be the exclusive or of the random number and the non-public data element.

The processor may be further configured to substitute the resultant number for the non-public data element in the URI.

The apparatus may include a transmitter. The transmitter may be configured to transmit the URI and the random number to a server. The random number may be transmitted with the URI, using JavaScript, Python, PHP, Perl or any other suitable computer language. The transmission of the random number may ensure that the server may extract the non-public data element from the URI. The non-public data element may be retrieved by computing a mathematical calculation on the resultant number, which may have been substituted for the non-public data element, and the random number. The mathematical calculation may be a reverse mathematical operation of the mathematical operation which produced the resultant number. For example, a mathematical operation which produced a resultant number may be a random number exclusive or with a non-public data element. Therefore, the reverse operation, which may result in the non-public data element, may be the resultant number exclusive or with the random number.

The apparatus may also include a receiver. The receiver may be configured to receive a resource from the server. The receipt of the resource from the server may be in response to the transmission of the URI and the random number to the server.

In another embodiment, the receiver may also be configured to receive the random number in addition to the resource. In this embodiment, the processor may retrieve the non-public data element using a reverse mathematical calculation. The reverse mathematical calculation may be the reverse of the mathematical calculation which produced the resultant number. The resultant number may have been substituted for the non-public data element. The processor may be further configured to substitute the non-public data element in the URI of the resource for the resultant number. This embodiment may allow a user to view the URI in its unchanged form, yet retain privacy of the non-public data element in transmission and receipt of the URI and/or resource from the server.

The processor may be further configured to create an array of elements, in response to the determination of the presence of more than one non-public data element. Each member of the array may be a random number. Each random number may be generated by the processor. Each random number may correspond to each non-public data element. Each random number may be at least as long as the length of the non-public data element to which it corresponds.

The processor may also be configured to store each random number in a different position in the array of elements. The order in which the random numbers are stored may correspond to the order which the non-public data elements appear in the URI. The correspondence of the order of the random numbers and the order of the appearance of the non-public data elements may facilitate easy retrieval of specific non-public data elements and the specific random number to which the non-public data element corresponds.

In other embodiments, the random numbers may be stored in a different order. The different order may raise the security level of the non-public data element, but require retrieval in a different manner. For example, the numbers may be stored in random order, and a table of keys may be saved to facilitate retrieval.

The processor may be further configured to substitute each non-public data element in the URI for the corresponding random number in the array of elements.

The transmitter may be further configured to transmit the URI and the array of elements to a server.

The receiver may be further configured to receive a resource from a server. The receipt of the resource may be in response to the transmission of the URI and the array of elements to the server.

In another embodiment, the apparatus may be further configured to determine the presence of a second non-public data element in the URI.

In this embodiment, the processor may be further configured to generate a second random number in response to the presence of second non-public data element. The length of the second random number may be at least as long as the length of the second non-public data element.

In this embodiment, the processor may be further configured to compute a second resultant number based on a mathematical calculation of the second random number and the second non-public data element. The mathematical calculation may be the exclusive disjunction, which may be alternatively referred to as exclusive or, or any other suitable logical calculation of the second random number and the second non-public data element.

In this embodiment, the processor may be further configured to substitute the second resultant number for the second non-public data element in the URI.

In this embodiment, the transmitter may be further configured to transmit the URI, the first random number, and the second random number to the server.

In this embodiment, the receiver may be configured to receive a resource from a server. The receipt of the resource may be in response to the transmission of the URI, the first random number and the second random number.

The processor may be further configured to transfer the resultant number to hexadecimal form, octal form, binary form, ASCII form or any other suitable form prior to substitution of the resultant number for the non-public data element. The transfer of the resultant number to a form described above may increase privacy of the non-public data element.

In some embodiments, the resultant number may change forms a number of times at different points during the transmission and receipt process to increase privacy of the non-public data element.

Illustrative embodiments of apparatus and methods in accordance with the principles of the invention will now be described with reference to the accompanying drawings, which form a part hereof. It is to be understood that other embodiments may be utilized and structural, functional and procedural modifications may be made without departing from the scope and spirit of the present invention.

FIG. 1 is an illustrative block diagram of system 100 based on a computer 101. The computer 101 may have a processor 103 for controlling the operation of the mobile device and its associated components, and may include RAM 105, ROM 107, input/output module 109, and a memory 115. The processor 103 will also execute all software running on the computer—e.g., the operating system. Other components commonly used for computers such as EEPROM or Flash memory or any other suitable components may also be part of the computer 101.

The memory 115 may be comprised of any suitable permanent storage technology—e.g., a hard drive. The memory 115 stores software including the operating system 117 any application(s) 119 along with any data 111 needed for the operation of the system 100. Alternatively, some or all of computer executable instructions may be embodied in hardware or firmware (not shown). The computer 101 executes the instructions embodied by the software to perform various functions.

Input/output ("I/O") module may include connectivity to a microphone, keyboard, touch screen, and/or stylus through which a user of computer 101 may provide input, and may also include one or more speakers for providing audio output and a video display device for providing textual, audiovisual and/or graphical output.

System 100 may be connected to other systems via a LAN interface 113.

System 100 may operate in a networked environment supporting connections to one or more remote computers, such as terminals 141 and 151. Terminals 141 and 151 may be personal computers or servers that include many or all of the elements described above relative to system 100. The network connections depicted in FIG. 1 include a local area network (LAN) 125 and a wide area network (WAN) 129, but may also include other networks. When used in a LAN networking environment, computer 101 is connected to LAN 125 through a LAN interface or adapter 113. When used in a WAN networking environment, computer 101 may include a modem 127 or other means for establishing communications over WAN 129, such as Internet 131.

It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, application program(s) 119, which may be used by computer 101, may include computer executable instructions for invoking user functionality related to communication, such as email, Short Message Service (SMS), and voice input and speech recognition applications.

Computer 101 and/or terminals 141 or 151 may also be mobile devices including various other components, such as a battery, speaker, and antennas (not shown).

Terminal 151 and/or terminal 141 may be portable devices such as a laptop, cell phone, Blackberry™, or any other suitable device for storing, transmitting and/or transporting relevant information. Terminals 151 and/or terminal 141 may be other devices. These devices may be identical to system 100 or different. The differences may be related to hardware components and/or software components.

Figure 2:
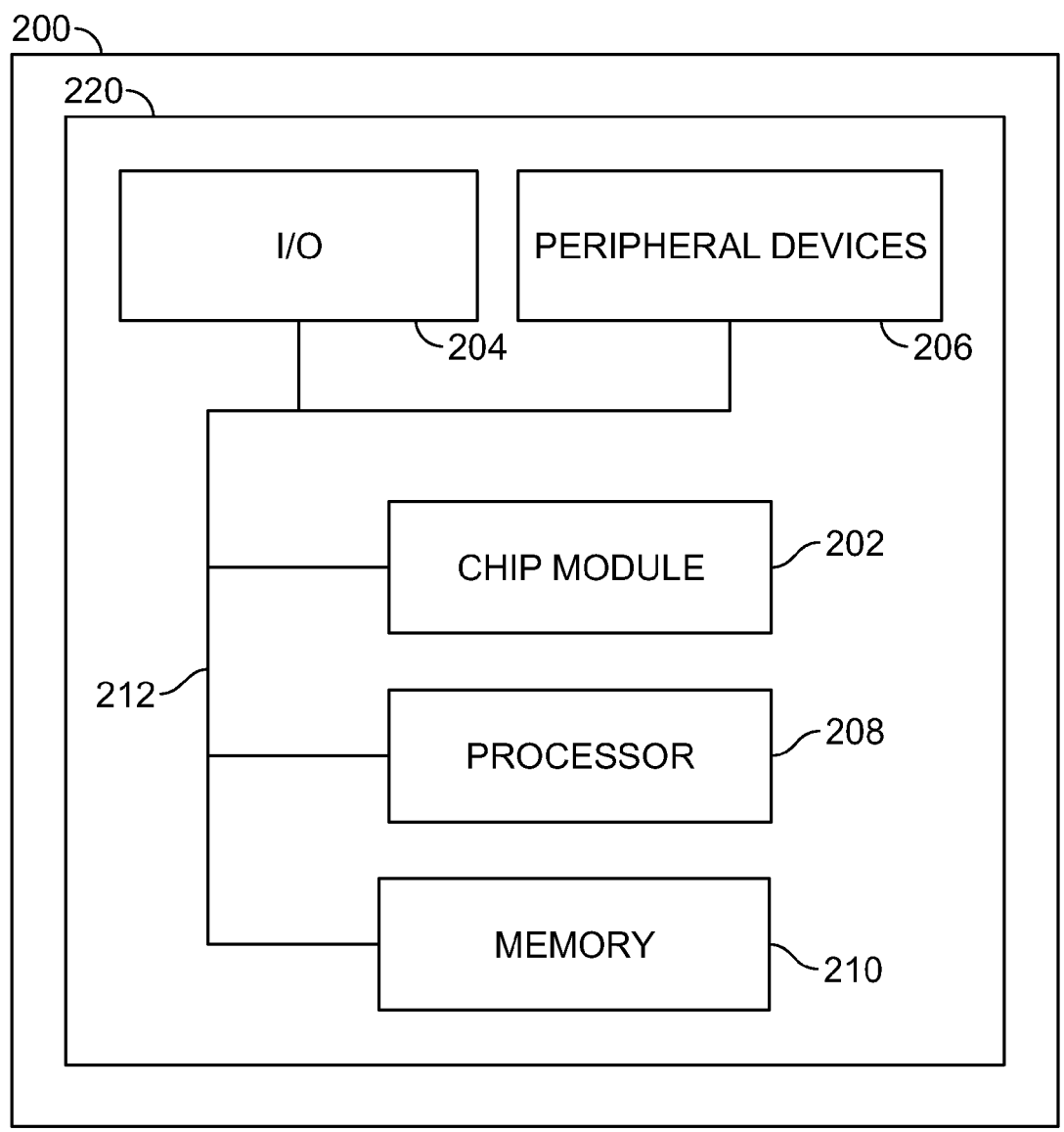
FIG. 2 shows an illustrative apparatus in accordance with the principles of the invention.

FIG. 2 shows illustrative apparatus 200. Apparatus 200 may be a computing machine. Apparatus 200 may include one or more features of the apparatus shown in FIG. 1. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable encoded media or devices; peripheral devices 206, which may include counter timers, real-time timers, power-on reset generators or any other suitable peripheral devices; logical processing device 208, which may compute data structural information, structural parameters of the data, quantify indices, random numbers, URIs; and machine-readable memory 210.

Machine-readable memory 210 may be configured to store in machine-readable data structures: URIs, the current time, random numbers, information pertaining to a resource user and any other suitable information or data structures.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3:
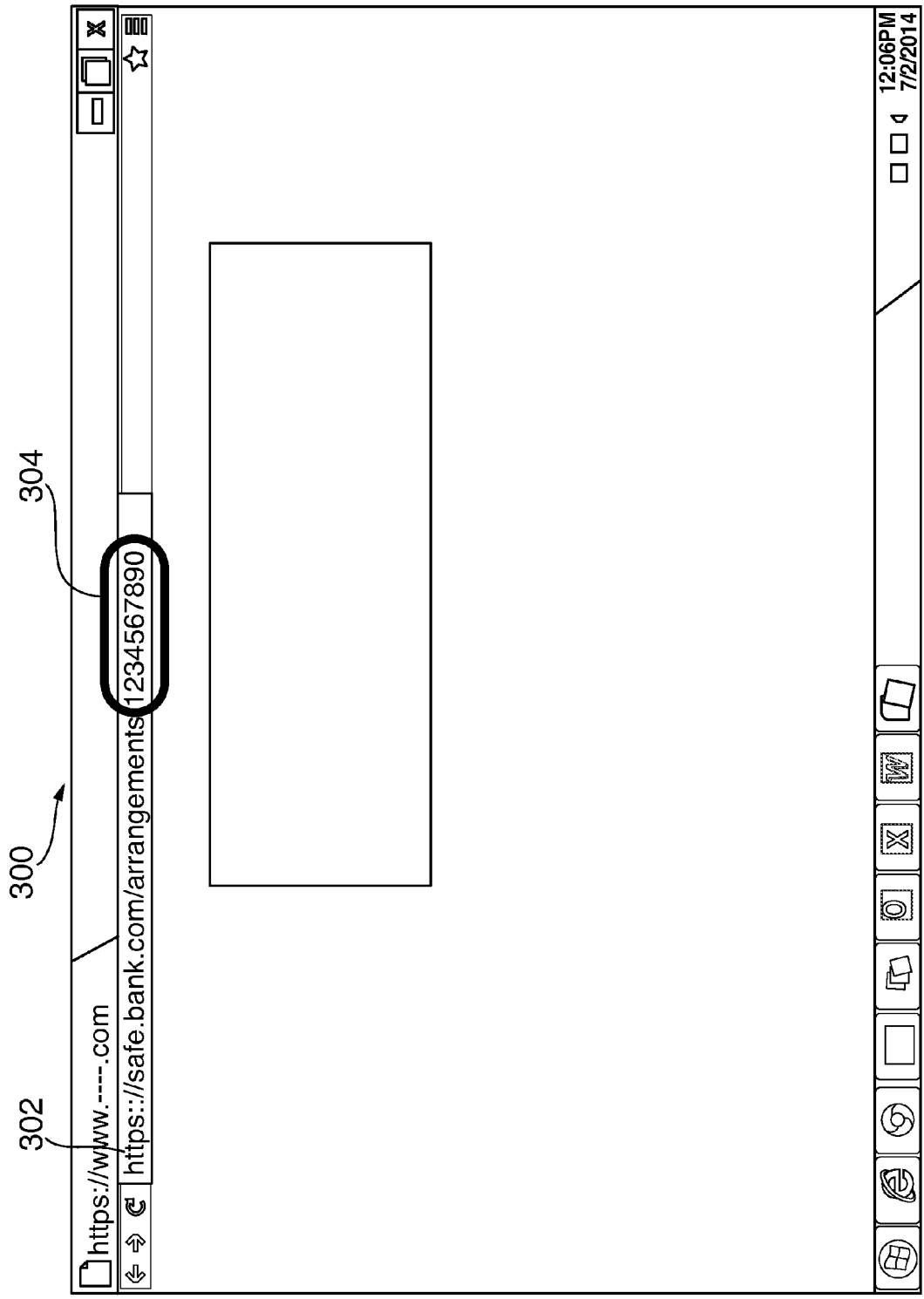
FIG. 3 shows an illustrative graphical user interface ("GUI") in accordance with the principles of the invention.

FIG. 3 shows an illustrative GUI webpage. Webpage 300 may include URI 302. URI 302 may be the address of webpage 300. URI 302 may contain non-public data element 304. Non-public data element 304 may be, for example, a user's social security number, telephone number, tax id number, or any other non-public data element. Non-public data element 304 may be plainly visible to someone who has the capability to view the user's URI history. Non-public data element 304 may also be plainly visible someone who has access to the log files of an illustrative, fictional website, www.----.com.

Figure 4:
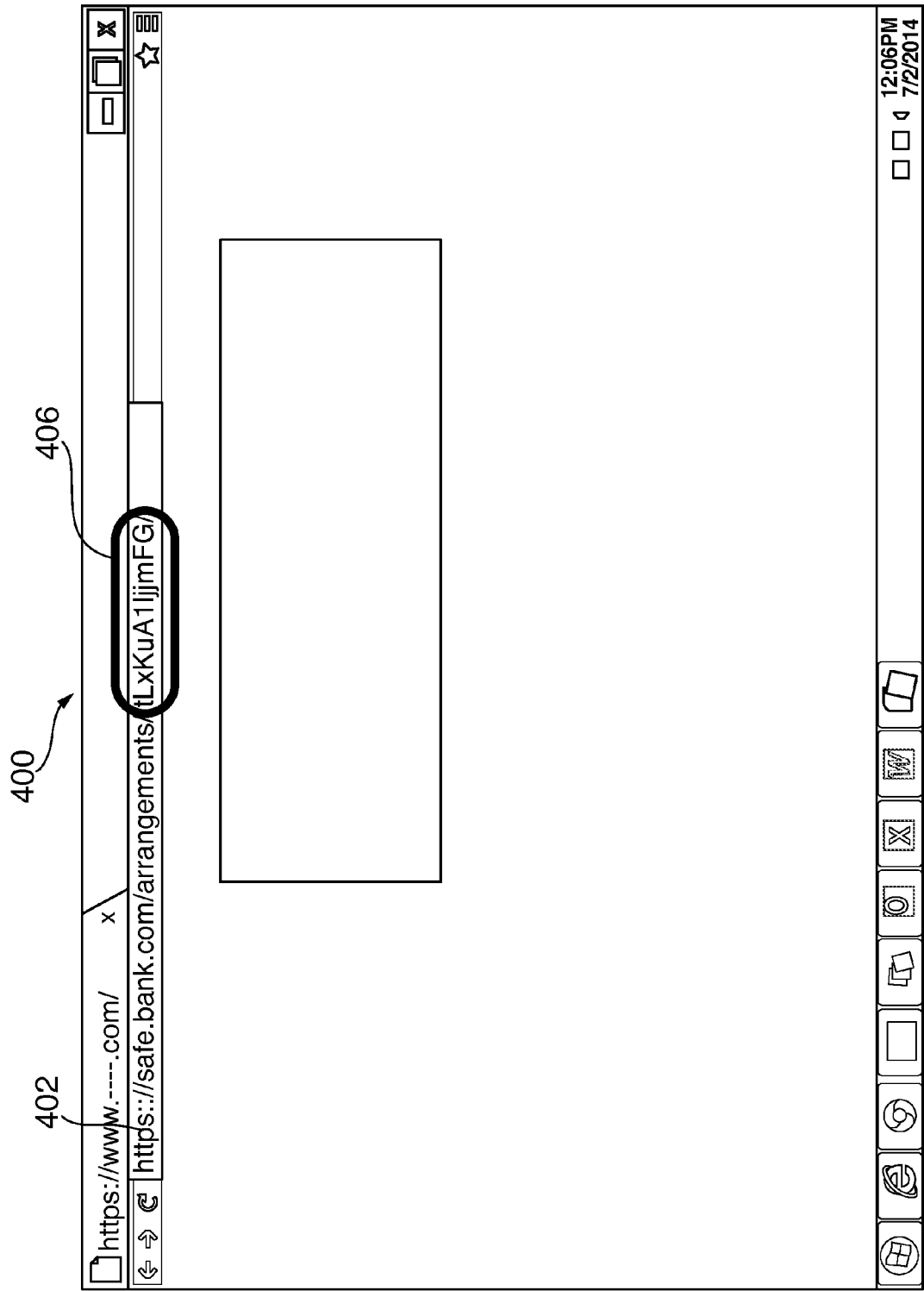
FIG. 4 shows an illustrative GUI in accordance with the principles of the invention.

FIG. 4 shows an illustrative GUI webpage. Webpage 400 may include URI 402. URI 402 may be the address of webpage 400. URI 402 may contain number 406. Number 406 may be the result of a mathematical calculation. The mathematical calculation may be the exclusive disjunction of a random number generated by a processor and a non-public data element. The random number may be transmitted to a server with the webpage using JavaScript, Python, Perl, or any other suitable computer language. The server, which may be located at, or associated with www.----.com may execute a subroutine to determine the non-public data element by performing a reverse operation of the mathematical calculation previously performed to produce the resultant number. This process may minimize the possibility of non-public data elements being plainly visible.

Figure 5:
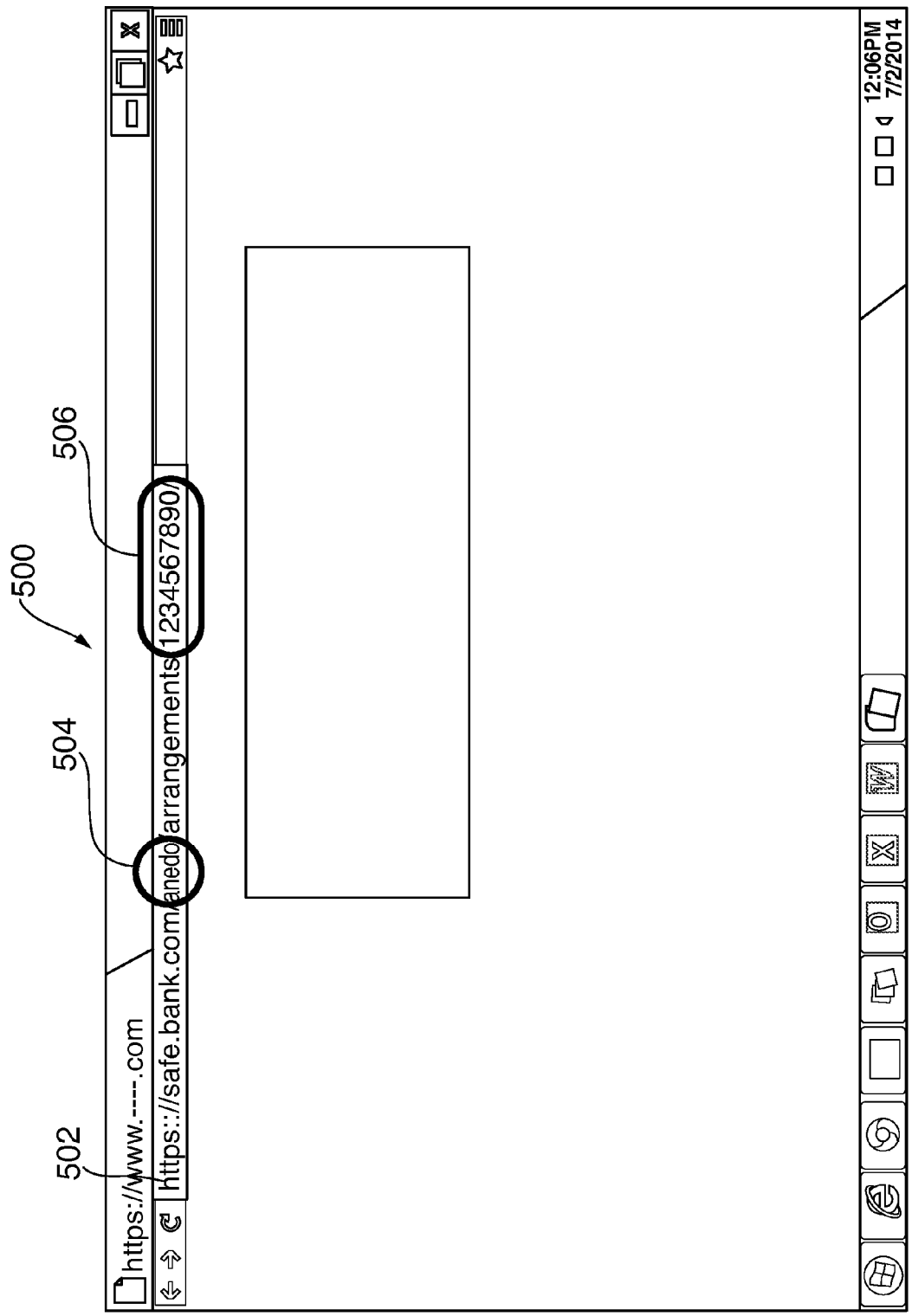
FIG. 5 shows an illustrative GUI in accordance with the principles of the invention.
Figure 6:
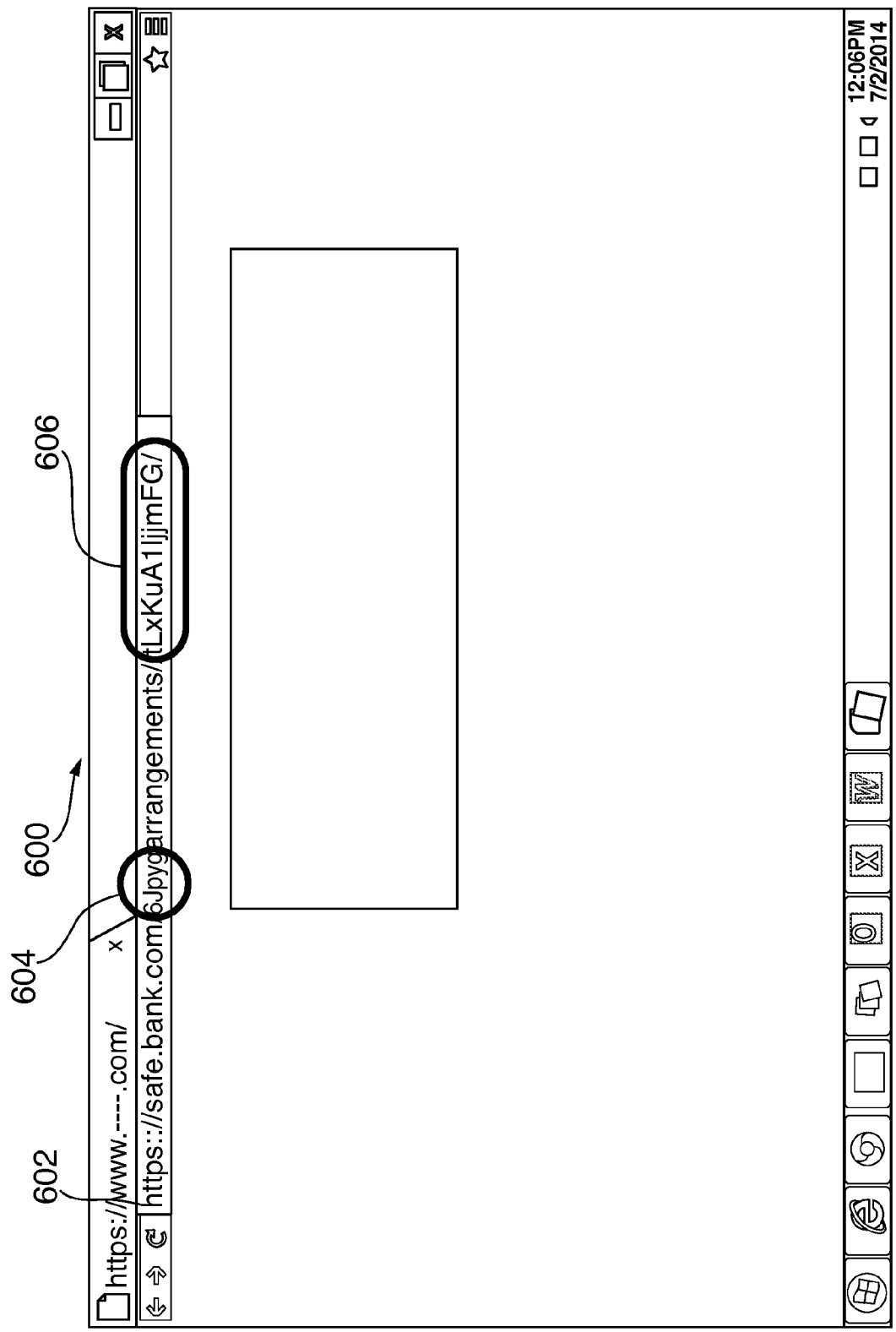
FIG. 6 shows an illustrative GUI in accordance with the principles of the invention.

While FIGS. 3 and 4 illustrate an exemplary scenario where a URI contains one non-public data element, FIGS. 5 and 6 illustrate an exemplary scenario where a URI contains a plurality of non-public data elements. FIG. 5 shows an illustrative GUI webpage. Webpage 500 may include URI 502. URI 502 may be the address of webpage 500. URI 502 may contain non-public data elements 504 and 506. Non-public data elements 504 and 506 may be a user's name, social security number, telephone number, tax id number, or any other non-public data element. Non-public data elements 504 and 506 may be plainly visible to someone who has the capability to view the user's URI history. Non-public data elements 504 and 506 may also be plainly visible someone who has access to the log files of www.-----.com.

FIG. 6 shows an illustrative GUI webpage. Webpage 600 may include URI 602. URI 602 may be the address of webpage 600. URI 602 may contain numbers 604 and 606. Numbers 604 and 606 may be the result of mathematical calculations. The mathematical calculations may be the exclusive disjunction of a random number generated by a processor, one random number for each non-public data element, and a non-public data element. The random numbers may be transmitted to a server in an array, or any other suitable data structure, with the webpage using JavaScript, Python, Perl, or any other suitable computer language. The server, which may be www.-----.com, may determine the non-public data elements by performing a reverse operation of the mathematical calculations previously performed to produce the resultant numbers. This process may minimize the possibility of non-public data elements being plainly visible.

Figure 7:
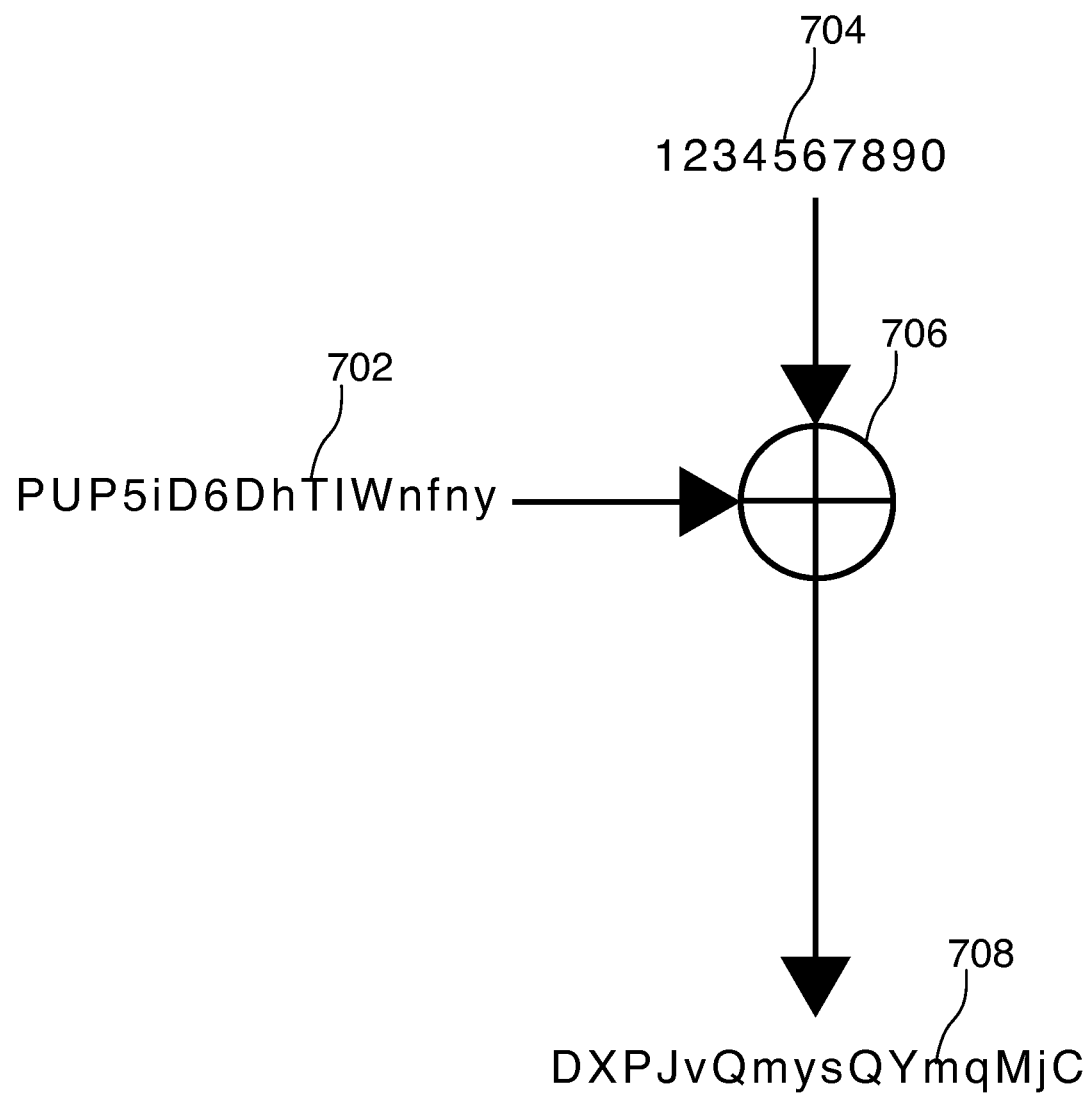
FIG. 7 shows an illustrative diagram in accordance with the principles of the invention.

An exemplary embodiment of the mathematical calculation of the random number and non-public data element discussed in FIGS. 5 and 6 is shown in FIG. 7. FIG. 7 shows an illustrative diagram. Non-public data element 704 may be found in a URI. A processor may preferably substantially continuously check URIs and resources to determine if a user is visiting a resource which may contain non-public data elements in its URI. If the processor determines that a URI may contain a non-public data element, the processor may flag the URI and perform a subroutine on the URI. The subroutine may include generating random number 702 in response to determining that non-public data element 704 is found in the URI. Non-public data element 704 and random number 702 may be input into mathematical operation 706. Mathematical operation 706 may be exclusive disjunction, which may be referred to as exclusive or, or any other suitable mathematical operation. A result of mathematical operation 706 may be number 708. The processor may substitute number 708 for non-public data element 704 in the URI.

As will be appreciated by one of skill in the art, the invention described herein may be embodied in whole or in part as a method, a data processing system, or a computer program product. Accordingly, the invention may take the form of an entirely hardware embodiment, an entirely software embodiment or an embodiment combining software, hardware and any other suitable approach or apparatus.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

The invention may be described in the general context of computer-executable instructions, such as program modules, being executed by a computer. Generally, program modules may include routines, programs, objects, components, data structures, etc., that perform particular tasks or store or process data structures, objects and other data types. The invention may also be practiced in distributed computing environments where tasks are performed by separate (local or remote) processing devices that are linked through a communications network.

In a distributed computing environment, program modules may be located in both local and remote computer storage media including memory storage devices. In a distributed computing environment, devices that perform the same or similar function may be viewed as being part of a "module" even if the devices are separate (whether local or remote) from each other.

Thus, methods and apparatus for masking non-public data elements in URIs are provided. Persons skilled in the art will appreciate that the present invention can be practiced by other than the described embodiments, which are presented for purposes of illustration rather than of limitation, and that the present invention is limited only by the claims that follow.

What is claimed is:

1. A hand-held device, said device for masking non-public data elements in uniform resource identifiers, said hand-held device comprising:
   a resource;
   a uniform resource identifier ("URI"), which is configured to identify the resource;
   a processor, on said hand-held device, said processor configured to determine, within said hand-held device, the presence of a non-public data element in the URI;
   the processor further configured to generate a random number, within said hand-held device, wherein the length of the random number is at least as long as the length of the non-public data element, in response to the determination of the presence of the non-public data element;
   the processor further configured to compute, within said hand-held device, a resultant number based on the exclusive disjunction of the random number and the non-public data element; and
   the processor further configured to substitute, within said hand-held device, the resultant number for the non-public data element in the URI, said substituting occurring prior to transmission of the URI to a server.

2. The apparatus of claim 1, further comprising a transmitter, wherein the transmitter is configured to transmit the URI and the random number to a server.

3. The apparatus of claim 2, further comprising a receiver, wherein the receiver is configured to receive the resource from the server in response to the transmission of the URI and the random number to the server.

4. The apparatus of claim 1, wherein, in response to the determination of the presence of more than one non-public data element, the processor is further configured to create an array of elements, wherein each member of said array is a random number, generated by the processor, corresponding to each non-public data element, wherein each random number is at least as long as the length of the non-public data element to which it corresponds.

5. The apparatus of claim 4, wherein the processor is further configured to store each random number in a different position in the array of elements, wherein the order in which the random numbers are stored correspond to the order in which the non-public data elements, which the random numbers correspond to, appear in the URI.

6. The apparatus of claim 5, wherein the processor is further configured to substitute each non-public data element for the corresponding random number in the array of elements.

7. The apparatus of claim 6, further comprising a transmitter, wherein the transmitter is configured to transmit the URI and the array of element to a server.

8. The apparatus of claim 7, further comprising a receiver, wherein the receiver is configured to receive the resource from a server in response to the transmission of the URI and the array of elements to a server.

9. The apparatus of claim 1, wherein the processor configured to determine the presence of a second non-public data element in the URI;
the processor being further configured to generate a second random number, wherein the length of the second random number is at least as long as the length of the second non-public data element, in response to the determination of the presence of the second non-public data element;
the processor further configured to compute a second resultant number based on the exclusive disjunction of the second random number and the second non-public data element; and
the processor further configured to substitute the second resultant number for the second non-public data element in the URI.

10. The apparatus of claim 9, further comprising a transmitter, wherein the transmitter is configured to transmit the URI, the first random number and the second random number to a server.

11. The apparatus of claim 10, further comprising a receiver, wherein the receiver is configured to receive the resource from a server in response to the transmission of the URI, the first random number and the second random number to a server.

12. The apparatus of claim 4, wherein the processor is further configured to transfer the resultant number to hexadecimal form, prior to substituting the resultant number for the non-public data element.

13. The apparatus of claim 4, wherein the processor is further configured to transfer the resultant number to octal form, prior to substituting the resultant number for the non-public data element.

14. The apparatus of claim 4, wherein the processor is further configured to transfer the resultant number to binary form, prior to substituting the resultant number for the non-public data element.

15. The apparatus of claim 4, wherein the processor is further configured to transfer the resultant number to ASCII form, prior to substituting the resultant number for the non-public data element.

16. A hand-held device, said device for masking non-public data elements in uniform resource identifiers, said hand-held device comprising:
a resource;
a uniform resource identifier ("URI"), which is configured to identify the resource;
a processor, on said hand-held device, said processor configured to determine, within said hand-held device, the presence of a non-public data element in the URI;
the processor further configured to generate a random number, within said hand-held device, wherein the length of the random number is at least as long as the length of the non-public data element, in response to the determination of the presence of the non-public data element;
the processor further configured to compute, within said hand-held device, a resultant number based on the bit-wise modulus 2 addition and/or subtraction of the random number and the non-public data element; and
the processor further configured to substitute, within said hand-held device, the resultant number for the non-public data element in the URI.

17. The apparatus of claim 16, further comprising a transmitter, wherein the transmitter is configured to transmit the URI and the random number to a server.

18. The apparatus of claim 17, further comprising a receiver, wherein the receiver is configured to receive the resource from the server in response to the transmission of the URI and the random number to the server.

19. One or more non-transitory computer-readable media storing computer-executable instructions which, when executed by a hand-held device's processor on a computer system, perform a method for masking non-public data elements in uniform resource identifiers comprising:
determining, within said hand-held device, a URI of a resource;
determining, within said hand-held device, the presence of a non-public data element in the URI;
generating a random number, within said hand-held device, wherein the length of the random number is at least as long as the length of the non-public data element, in response to the determination of the presence of the non-public data element;
computing a resultant number, within said hand-held device, based on a mathematical calculation of the random number and the non-public data element;
substituting the resultant number, within said hand-held device, for the non-public data element in the URI;
transmitting the URI and the random number, from said hand-held device, to a server;
receiving the resource, at said hand-held device, from the server, in response to the transmission of the URI and the random number to the server; and
computing, within said hand-held device, the non-public data element using the random number and the resultant number; and
substituting, within said hand-held device, the non-public data element for the resultant number in the URI.

20. The method of claim 19, further comprising re-determining the URI associated with the resource.

* * * * *